US008151691B2

(12) United States Patent
Pirault et al.

(10) Patent No.: US 8,151,691 B2
(45) Date of Patent: Apr. 10, 2012

(54) VARIABLE COMPRESSION RATIO PISTON WITH RATE-SENSITIVE RESPONSE

(75) Inventors: Jean-Pierre Pirault, Shoreham-by-Sea (GB); Riccardo Meldolesi, Hove (GB); Christopher Chadwell, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 751 days.

(21) Appl. No.: 12/328,497

(22) Filed: Dec. 4, 2008

(65) Prior Publication Data

US 2010/0139479 A1 Jun. 10, 2010

(51) Int. Cl.
*F16J 1/06* (2006.01)
*F02B 75/00* (2006.01)

(52) U.S. Cl. .................................... 92/181 P; 123/78 R

(58) Field of Classification Search ........... 92/84, 181 P; 123/78 R, 78 B See application file for complete search history.

(56) References Cited

U.S. PATENT DOCUMENTS 1,926,598 A * 9/1933 Peterson ..................... 123/78 R
3,156,162 A 11/1964 Wallace et al.
3,303,831 A 2/1967 Sherman
3,311,096 A * 3/1967 Carney et al. ............... 123/78 R
3,405,679 A 10/1968 Norris et al.
3,405,697 A 10/1968 Marchand
3,777,724 A * 12/1973 Kiley .......................... 123/78 B
4,241,705 A * 12/1980 Karaba et al. ..................... 92/82
5,257,600 A 11/1993 Schechter et al. .......... 123/78 B

FOREIGN PATENT DOCUMENTS

GB 762074 6/1952 ............................ 7/2
GB 899198 10/1960 ........................ 122/1
GB 902707 10/1960 ........................ 122/1
GB 1032523 1/1965
GB 2110791 11/1982
GB 2110791 A * 6/1983

* cited by examiner

*Primary Examiner* — Thomas E Lazo

(74) *Attorney, Agent, or Firm* — Chowdhury & Georgakis PC; Ann C Livingston

(57) ABSTRACT

A hydraulic variable compression ratio (VCR) piston for use in an internal combustion engine. The piston is a two-part piston, in which a gudgeon pin carrier slides within an outer sleeve. A variable volume upper chamber is formed between the top of the gudgeon pin carrier and the end of the outer sleeve. When the upper chamber fills with oil, its volume increases, and the overall piston geometry is longer. This reduces the piston clearance in the cylinder and increases cylinder pressure. At a given maximum cylinder pressure or at a given rate of increase of cylinder pressure, oil from the upper chamber is relieved by using a rate-sensitive pressure relief valve.

15 Claims, 12 Drawing Sheets

VARIABLE COMPRESSION RATIO PISTON WITH RATE-SENSITIVE RESPONSE

TECHNICAL FIELD OF THE INVENTION

This invention relates to internal combustion engines, and more particularly to pistons used in such engines.

BACKGROUND OF THE INVENTION

The compression ratio of an internal combustion engine, broadly defined as the ratio of the maximum cylinder volume to the minimum cylinder volume, is an important parameter for controlling engine behavior. The compression ratio influences many factors, such as torque, fuel efficiency, emissions, cylinder pressures and temperatures.

Some internal combustion engines have a fixed compression ratio, selected to provide an acceptable trade-off of performance parameters. For example, for a diesel engine, the compression ratio is high enough to ensure compression ignition at cold ambient temperatures, without resulting in excessively high cylinder pressures at full load.

Engines having a variable compression ratio (VCR) have a means of controlling the compression ratio so that improved trade-offs can be realized. For example, a variable compression ratio might provide a higher compression ratio for starting the engine and a lower compression ratio at full load operation.

One approach to providing a VCR engine is to provide controllable changes to the piston geometry, which influences the cylinder volume. In the past, such VCR pistons have reduced the range of maximum cylinder pressure experienced by a particular engine, the piston geometry changing so that cylinder pressure does not exceed a certain value, under most, but probably not all, circumstances. The piston geometry changes are usually achieved over several engine cycles. Depending on engine conditions, the number of cycles for the compression ratio to change, by five ratios for example, may be from 20-30 cycles.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Introduction

Figure 1:
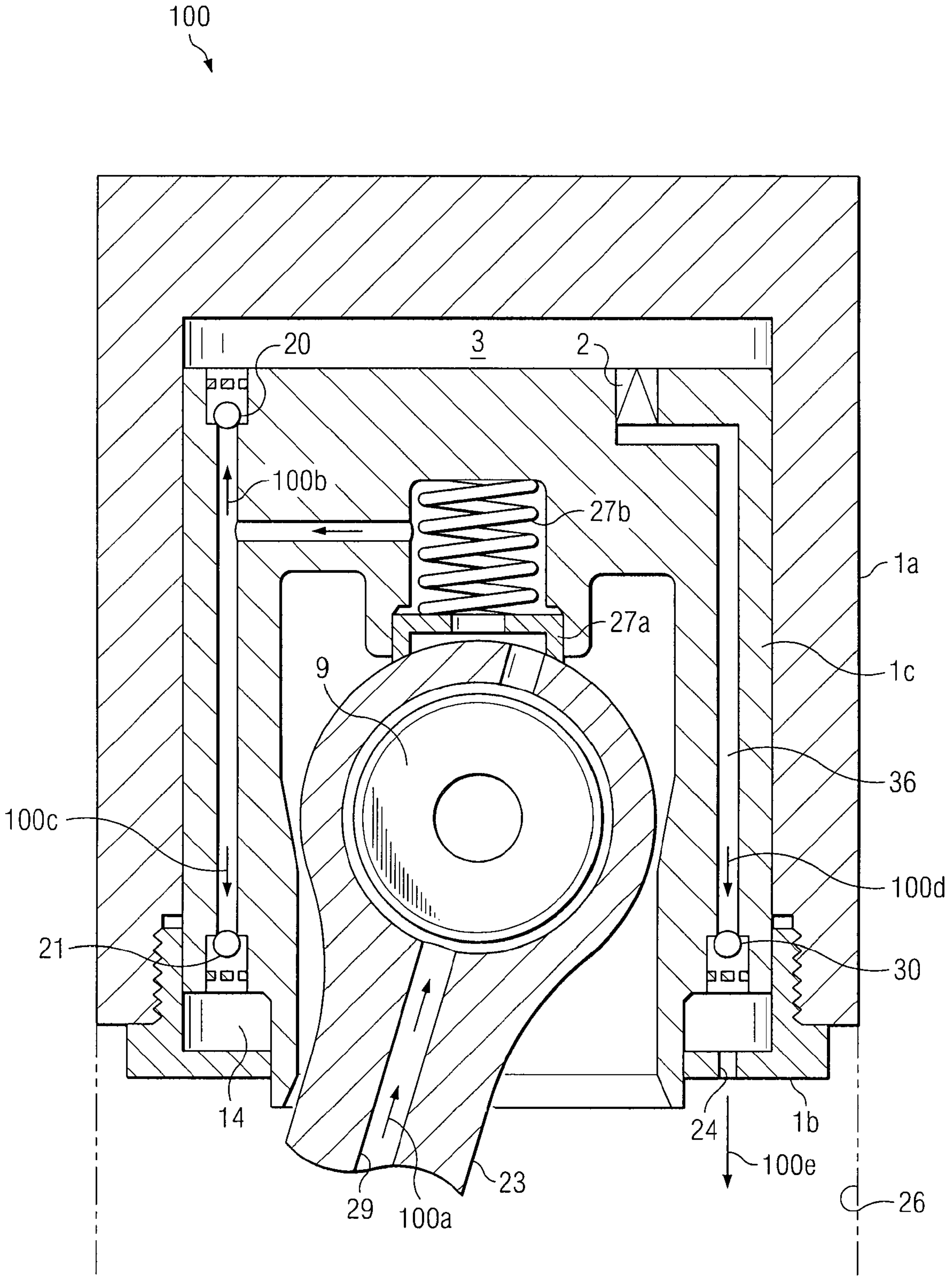
FIG. 1 is a section view of an example of a prior art hydraulic variable compression ratio piston.

It is advantageous to control both the rate of cylinder pressure rise as well as the peak cylinder pressure. Overly high rates of rise of cylinder pressure can result in unacceptable engine noise.

The piston described herein is a hydraulic variable compression ratio (VCR) piston operable to: 1) control the rate of pressure rise of cylinder pressure, in addition to controlling the peak cylinder pressure; 2) dynamically adjust the target peak cylinder pressure; 3) dynamically adjust the target rate of cylinder pressure rise; and 4) reduce energy losses normally associated with in-cycle compression ratio reduction.

The piston described herein is applicable to either compression ignition or spark ignition internal combustion engines. It is applicable to all types of hydraulic piston engines, including 2-stroke and 4-stroke configurations. Although some figures show only a single piston, all embodiments of the piston can be used with engines having multiple pistons.

DEFINITIONS

The "piston" of an engine is a male element that can slide in a cylinder, with a high degree of sealing, and act on gases in the cylinder, either transferring work from these gases to the output drive mechanism of the engine, or transferring work from the output drive mechanism, usually a crankshaft and flywheel, of the engine to gases in the cylinder.

The "piston crown" is the surface of the piston in contact with the working fluid of the cylinder.

A "gudgeon pin" is a sliding joint and link between the piston and connecting rod, usually cylindrical with one major axis.

The "compression height" of a piston is the height of the piston from the major axis of the gudgeon pin to the functional surface of the piston crown.

A "variable compression ratio piston" is a piston that can provide a range of compression heights during engine operation in response to cylinder pressure. A change in compression height will result in a change of compression ratio.

The "outer sleeve" of a piston is a cylindrical structure that carries the load and seals the gases in the cylinder.

The "gudgeon pin carrier" is that portion of the piston that connects the piston to the connecting rod, usually via a sliding pin which engages in female cylindrical bores in the said carrier and the connecting rod.

The "cylinder" of a piston engine is a static part of the engine, which cyclically contains the working fluid, usually air and then exhaust gases. In combination with the piston, the cylinder creates the useful work from the working fluid onto the piston area which is connected to an output drive mechanism.

The "clearance volume" of a piston engine is the volume in the cylinder of the engine defined by the cylinder head, cylinder liner and piston, with the piston at its closest position to the cylinder head.

The "compression ratio" of a piston engine is the ratio of the total cylinder volume to the clearance volume.

A "conduit" is a pipe that contains flowing fluid from a first point to a second point.

A "check valve" allows only unidirectional flow of a fluid in a conduit.

A "pressure relief valve" controls the pressure in a closed fluid system by allowing some of the fluid to escape, usually recycling the escaped fluid back to the closed system. A pressure relief valve usually operates between a first higher fluid pressure source and a second lower fluid pressure source. It comprises a moving cylindrical male element, subject to spring preload, operating slideably in a female cylinder having an exit port. Under the action of fluid pressure, the male element moves within the female cylinder to connect a first pressure source to the exit port, which is in connection with a second pressure source, thereby controlling further increase in the fluid pressure.

The "Top Dead Center (TDC)" is the outermost travel position of a piston connected to a crankshaft system.

The "crankangle" is a measurement of the position of the engine crankshaft and working elements, such as the piston, in the overall 2 or 4-stroke cycle, with reference to a datum. The 2-stroke cycle is considered to occupy a single revolution or 360° crankangle, measured from the piston position at TDC. The 4-stroke cycle considered to occupy two revolutions or 720° crankangle, measured from the piston position at TDC.

The "exhaust stroke" is the portion of a 4-stroke cycle during which the exhaust gases are driven from the cylinder by movement of the piston towards the cylinder head. At least one valve is open in the cylinder during the exhaust stroke, so there is only light resistance to piston motion from the gases in the cylinder.

The "cylinder pressure" is the pressure developed by the working fluid in the cylinder, usually air and products of combustion. The cylinder pressure varies with piston position and engine crankangle.

The "peak cylinder pressure" is the highest cylinder pressure in the 2-stroke or 4-stroke cycle.

The "rate of rise of cylinder pressure" is the change in cylinder pressure divided by the crankangle or the time corresponding to the period over which the pressure changes. The highest rates of pressure change usually occur approaching the completion of the compression stroke of 2-stroke or 4-stroke cycles.

A "telescopic" mechanism is a mechanism in which a male element is made to slide, with clearance, within a female element, so that the male element can be partly or completely contained within the female element.

The "hydraulic pressure" is the pressure developed within the hydraulic system of the VCR piston.

Conventional VCR Pistons

FIG. 1 illustrates an example of a conventional variable compression ratio (VCR) piston of the hydraulic type. This piston is described in UK Pat. Nos. 762,074; 899,198; 902,707; and 1,032,523. These patents essentially describe a two-part piston. A first part is an outer sleeve 1*a*, which slides in a cylinder bore 26 and moves relative to the second part, a gudgeon pin carrier 1*c*, connected to a connecting rod 23 via a gudgeon pin 9.

A first hydraulic chamber 3 is formed between the underside of the crown of the outer sleeve 1*a* and the upper surface of the gudgeon pin carrier 1*c*. A second hydraulic chamber 14 is formed between the upper side of the closing plate 1*b* of the outer sleeve 1*a* and the lower surface of the gudgeon pin carrier 1*c*. Engine oil 100*a* is received from a drilling 29 in the connecting rod 23 and passes via channels in the gudgeon pin 9 or its supporting bearing to a spring loaded sliding seal 27*a*, and thence divides into two flows 100*b* and 100*c*.

During the exhaust stroke (of a 4-stroke engine cycle), inertial forces acting on the outer sleeve 1*a* move it upward relative to the gudgeon pin carrier 1*c*, enlarging volume 3 and thus inducing the oil flow 100*b* through the one way entry valve 20. Entry valve 20 is typically a check valve. This increases the compression ratio by reducing the clearance volume above the piston. This process continues for every exhaust stroke of each engine cycle until the cylinder pressure is such that hydraulic pressure in chamber 3 causes relief valve 2 to open and release fluid 100*d* from chamber 3 either directly to an oil volume or indirectly via an entry (check) valve 30 into the lower hydraulic chamber 14. This results in the outer sleeve 1*a* moving down relative to gudgeon pin carrier 1*c*, thereby reducing the compression ratio. The rate of relative movement of the outer sleeve 1*a* is also controlled by the second hydraulic chamber 14 which receives oil 100*c* via one way check valve 21, and has a controlled leak 100*e* into the open engine crankcase volume via drilling 24.

A check valve (not shown) is also fitted to the connecting rod drilling 29 so that the oil flow 100*a* cannot return to the big-end of the connecting rod. The pressure of the oil flow 100*a* is enhanced by the dynamic inertia forces acting on the oil column in drilling 29.

It should be noted that the hydraulic pressure in chamber 3 is a magnified version of the cylinder pressure, due to the differing effective areas of the piston crown and the hydraulic chamber. Hence, any changes in cylinder pressure will be sensed, in a magnified form, in hydraulic chamber 3. This sensing will be at the speed of sound, that is, very fast.

Rate-Sensitive VCR Piston

Figure 2:
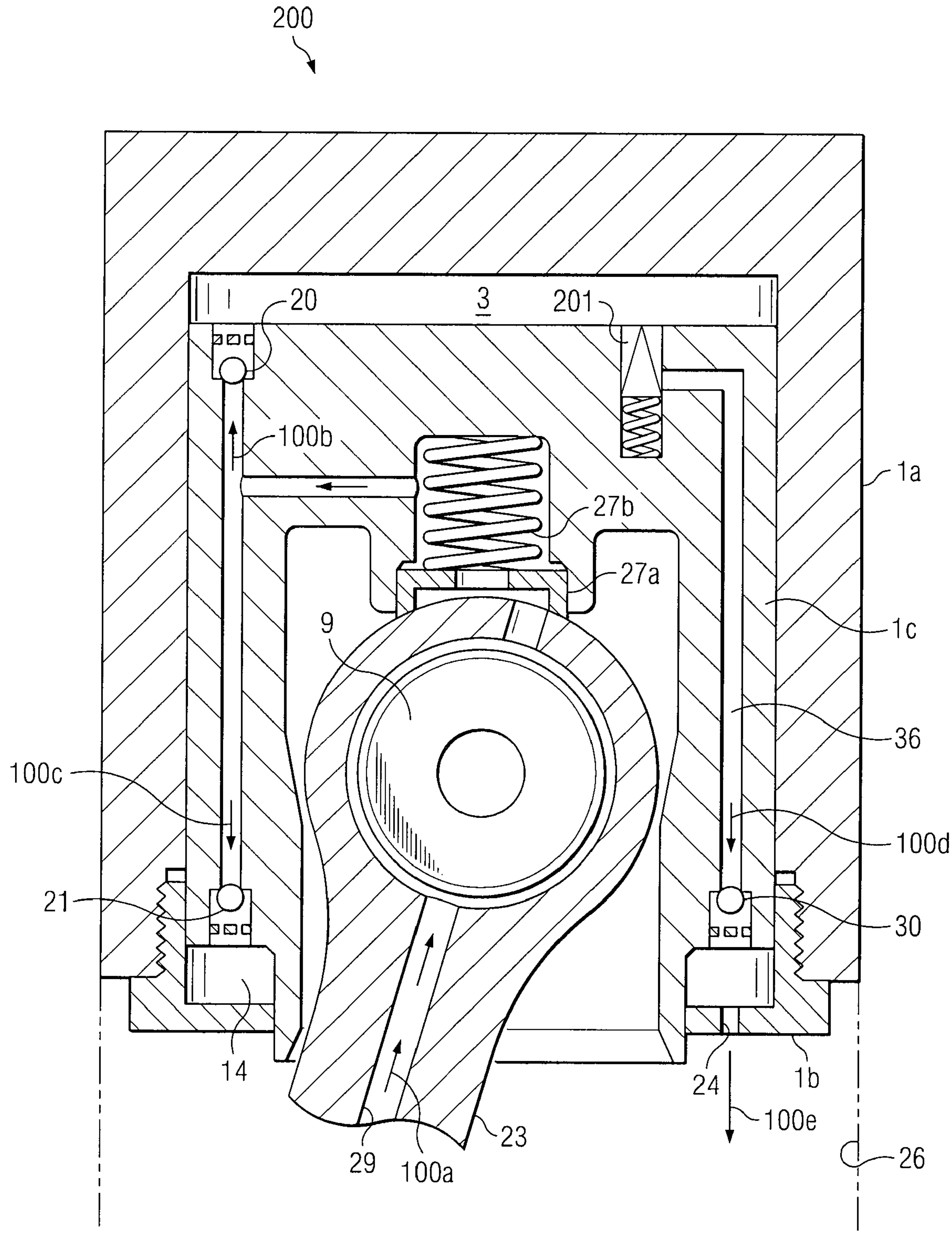
FIG. 2 is a section of an improved hydraulic variable compression ratio piston, that is, a piston having a rate sensitive check valve.
Figure 3:
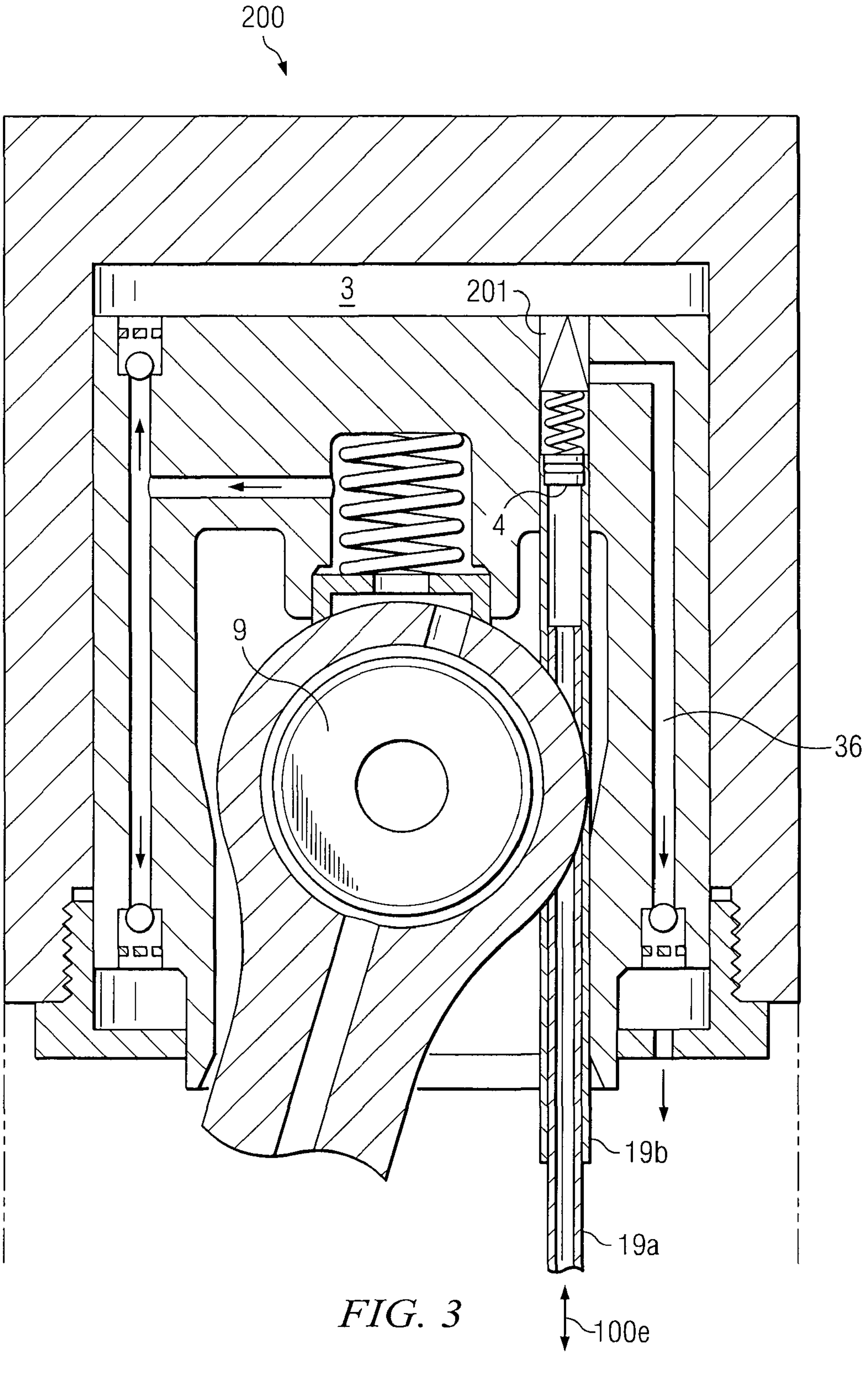
FIG. 3 illustrates the variable rate limiting pressure relief valve in the variable compression ratio piston.

FIGS. 2 and 3 illustrate the basic architecture of a hydraulic VCR piston 200 in accordance with the invention. In the broadest sense, the invention is directed to a hydraulic VCR piston 200 having a pressure relief valve 201 that responds to rate of change of cylinder pressure as well as to the mean cylinder pressure level.

For purposes of this description, the piston described herein is referred to as a "rate-sensitive variable compression ratio piston" or a "rate-sensitive VCR piston". Because many elements of the rate-sensitive VCR piston 200 are similar to those of piston 100 of FIG. 1, many reference numerals are the same. Valve 201 may also be referred to as "rate limiting" in the sense that it responds to a given rate of change of pressure.

As explained in further detail below, rate-sensitive sensitive relief valve 201 relieves fluid from upper hydraulic chamber 3, either when the pressure in chamber 3 exceeds a prescribed level or when the rate of pressure rise in chamber 3 exceeds a certain level. The relieved fluid 100*d* is routed via conduit 36, either to the crankcase volume or via one way check valve 30 to the lower hydraulic chamber 14.

As illustrated in FIG. 3, the pressure rate response characteristics of relief valve 201 may be dynamically varied, using modulated oil pressure applied via standpipe 19*a*. Standpipe 19*a* is in sliding connection, optionally with seals, with pipe 19*b* that is connected with gudgeon pin carrier 1*c*. Pipes 19*a* and 19*b* are essentially a telescopic hydraulic system with seals to minimize oil leakage.

Figure 4:
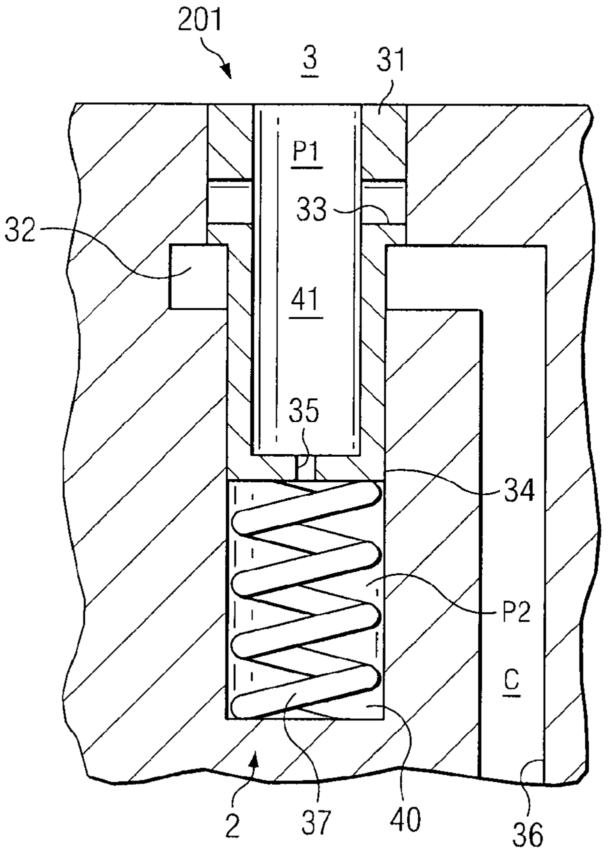
FIGS. 4 and 5 illustrate a first embodiment of the rate limiting pressure relief valve in its first position.
Figure 5:
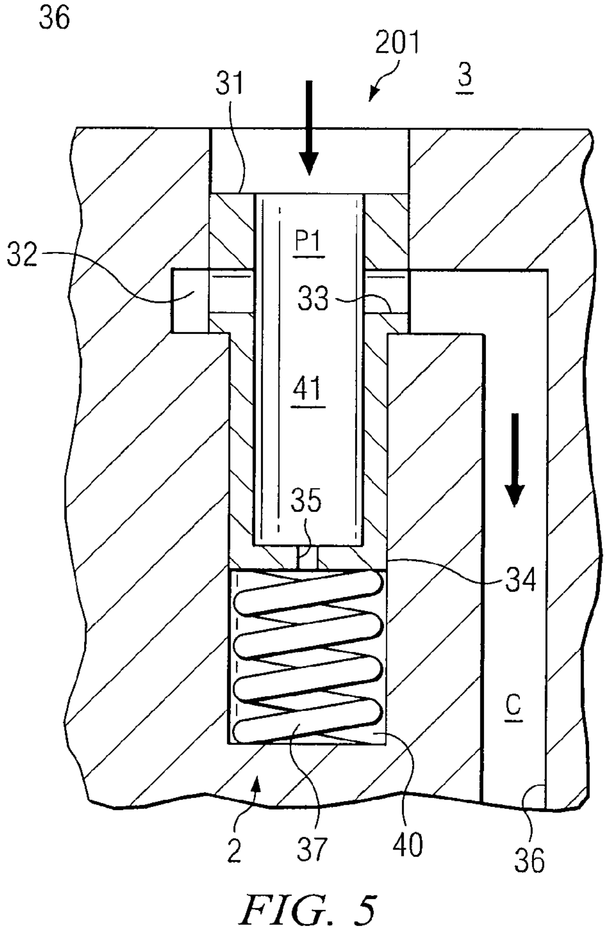

FIGS. 4 and 5 illustrate one embodiment of the rate-sensitive pressure relief valve 201. The upper hydraulic chamber 3 and a portion of the gudgeon pin carrier 1*c* are shown.

The rate-sensitive pressure relief valve 201 comprises two moving parts, a sleeve valve 31 (male element), which is in contact with a spring 37 contained in a dead ended chamber 40. The sleeve valve 31 has peripheral ports 33 and a small bleed orifice 35 in the end 34 adjacent the spring. Under steady state pressure conditions, the bleed port 35 allows flow into volume 40. The restrictive orifice 35 is designed to create a pressure drop under dynamic conditions between the bulk volume 3 and the dead ended volume 40.

A conventional pressure relief valve may have elements similar to those of valve 201 but without a bleed orifice 35. In a conventional valve, as the pressure at P1 increases gradually, spring 37 is progressively compressed, due to the pressure P1 acting on the differential area arrangement of the sleeve, until port 33 overlaps the outlet port 32, allowing the fluid to flow out of the volume 3 via outlet pipe 36.

Figure 6:
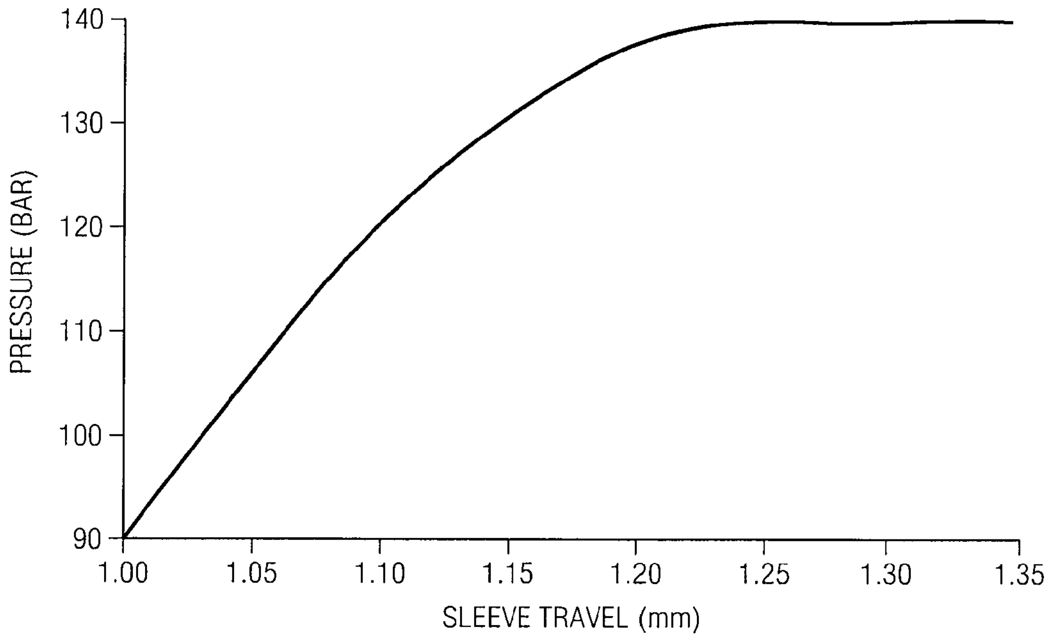
FIG. 6 illustrates the steady-state pressure characteristic for a pressure relief valve.
Figure 7:
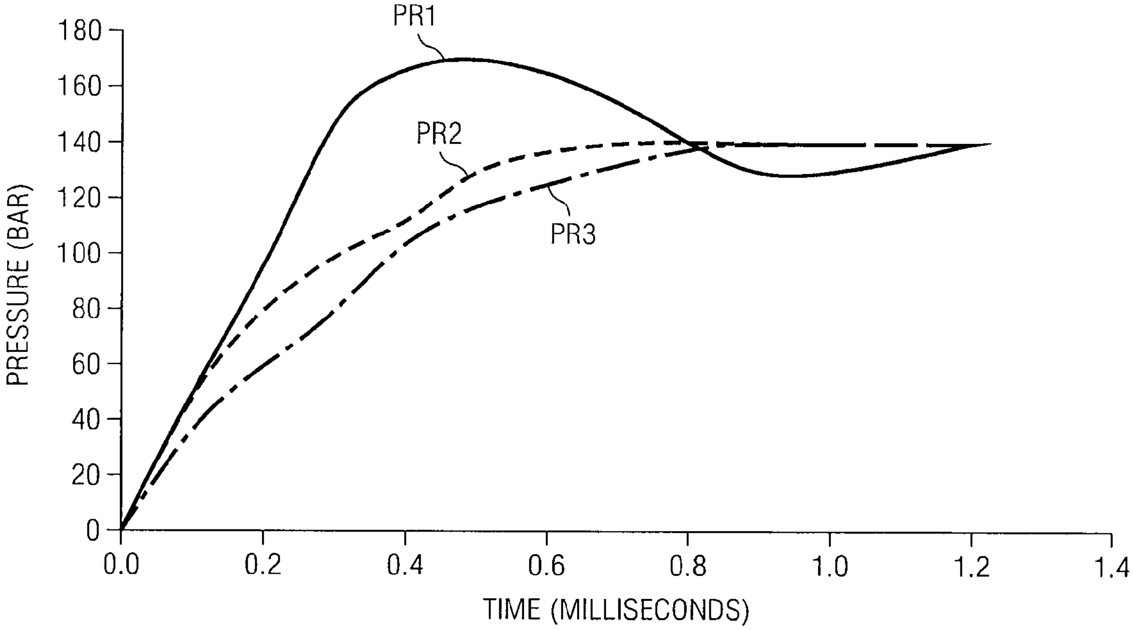
FIG. 7 illustrates pressure versus time curves for a conventional pressure relief valve and for a rate limited relief valve.

FIG. 6 illustrates the steady-state characteristic, PR4, of a relief valve. FIG. 7 illustrates relief valve characteristics in terms of pressure versus time. As shown by curve PR1, for a conventional valve, with rapid increases in pressure P1, the inertia of the sleeve and spring causes a time delay in response of the relief valve so that pressure in chamber 3 is not relieved instantaneously and the pressure overshoots the mean opening pressure.

For the rate-sensitive relief valve 201, when the rate of increase of pressure at P1 is slow, its operation is similar to that of a conventional valve and to the characteristic PR4, as shown in FIG. 6. However, for fast increases in pressure P1, there is inadequate time for oil to flow through orifice 35 into volume 40. Under these dynamic conditions, there is a pressure difference across end 34 of sleeve 31. The combined effects of this pressure difference and the compressibility of the trapped fluid in volume 40 result in more compression of the spring 37 so that the sleeve 31 moves a greater amount than under steady pressure and relieves the pressure in the main chamber 3 according to curve PR2. It should be realized that under the very high levels of pressure exhibited in this type of device, engine oil has significant compressibility. The curve PR3 represents the characteristics of a relief valve that transiently relieves hydraulic pressure at lower rates of pressure rise than relief valves associated with curves PR1 and PR2.

Figure 8:
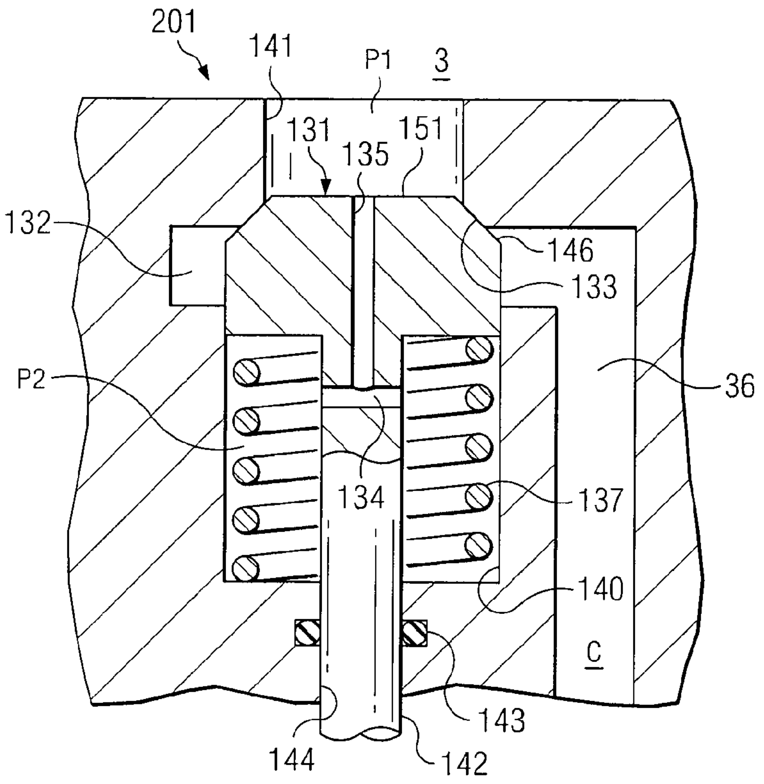
FIGS. 8 and 9 illustrate a second embodiment of the rate limiting pressure relief valve.
Figure 9:
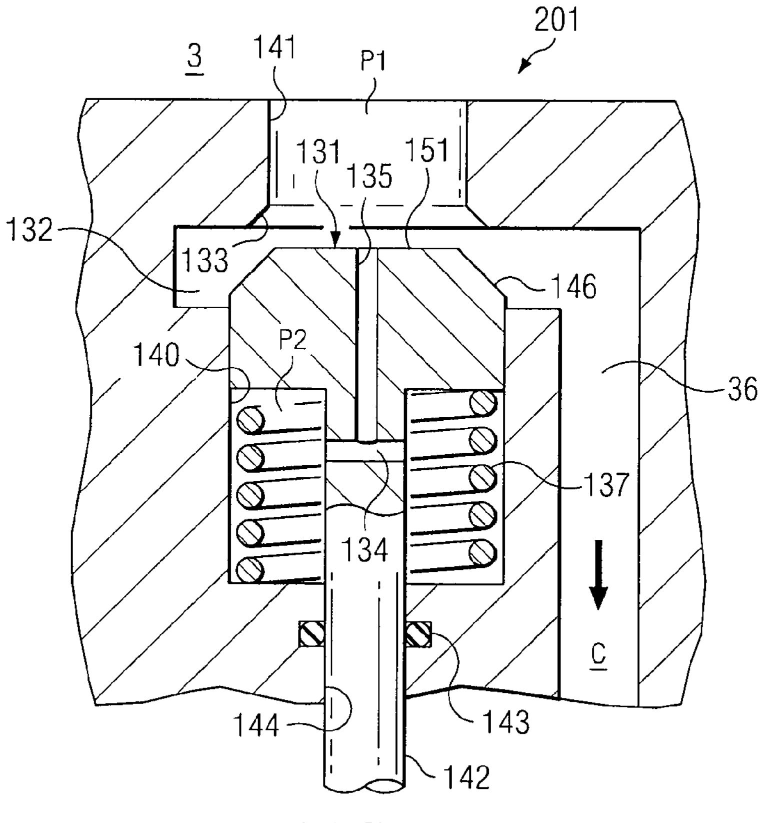

FIGS. 8 and 9 illustrate a second embodiment of a rate-sensitive relief valve 201. Portions of the upper hydraulic chamber 3 and gudgeon pin carrier 1*c* are shown.

In this embodiment, relief valve 201 comprises essentially two moving parts, a poppet valve 131 which is in contact with a spring 137 contained in a dead ended chamber 140. The poppet valve 131 is guided by a stem 142 through an aperture 144 in the end of the chamber 140. The poppet valve 131 has a male conical seat 146 which is in contact, under the closing pressure of the spring 137, with the female conical seat 133, when the load from the spring is greater than the load from the oil pressure in the upper hydraulic chamber 3. As the pressure P1 rises, the load on the face of the poppet valve overcomes the spring load, and the poppet moves off its seat and allows oil to flow in to the outlet port 132 and then into the exit pipe 36 in the gudgeon pin carrier 1*c*. The poppet valve 131 has a small bleed drilling or orifice 135, with connections 134, linking the pressure face 151 of the poppet to the oil chamber 140. Under steady state pressure conditions, the bleed port 135 allows flow in to the volume 140, but the restrictive orifice 135 is designed to create a pressure drop under dynamic conditions between the bulk volume 3 and the volume 140.

A conventional poppet-type pressure relief valve does not have a bleed orifice 135. For a conventional valve, as P1 increases gradually, spring 137 is progressively compressed, due to the pressure P1 acting on the face area of the poppet valve, until the poppet valve 131 lifts from the seat 133 and allows flow to the outlet port 132, allowing the fluid to flow out of the volume 3 via outlet pipe 36.

Referring again to FIG. 6, curve PR4 illustrates the typical steady-state characteristic for a poppet type relief valve as well as for the valve of FIGS. 4 and 5. Referring again to FIG. 7, curve PR1 illustrates how, for a conventional poppet-type valve, with rapid increases in pressure P1, the inertia of the poppet valve and spring causes a time delay in response of the relief valve so that pressure in the bulk volume 3 is not relieved instantaneously and the pressure overshoots the mean opening pressure.

With a rate-sensitive relief valve 201, such as that of FIGS. 8 and 9, the response is similar to characteristic PR4, as shown in FIG. 6, when the rate of increase in pressure P1 is slow. However, for fast increases in pressure P1, there is inadequate time for oil to flow through drillings 135 and 134 into the volume 140. Under these dynamic conditions, there is a pressure difference acting on the face 151 of poppet valve 131. The combined effects of this pressure difference and the compressibility of the trapped fluid in volume 140 result in more compression of the spring 137 so that the poppet valve 131 moves a greater amount than under steady pressure and relieves the pressure in the main chamber 3 according to curve PR2 in FIG. 7.

Figure 10:
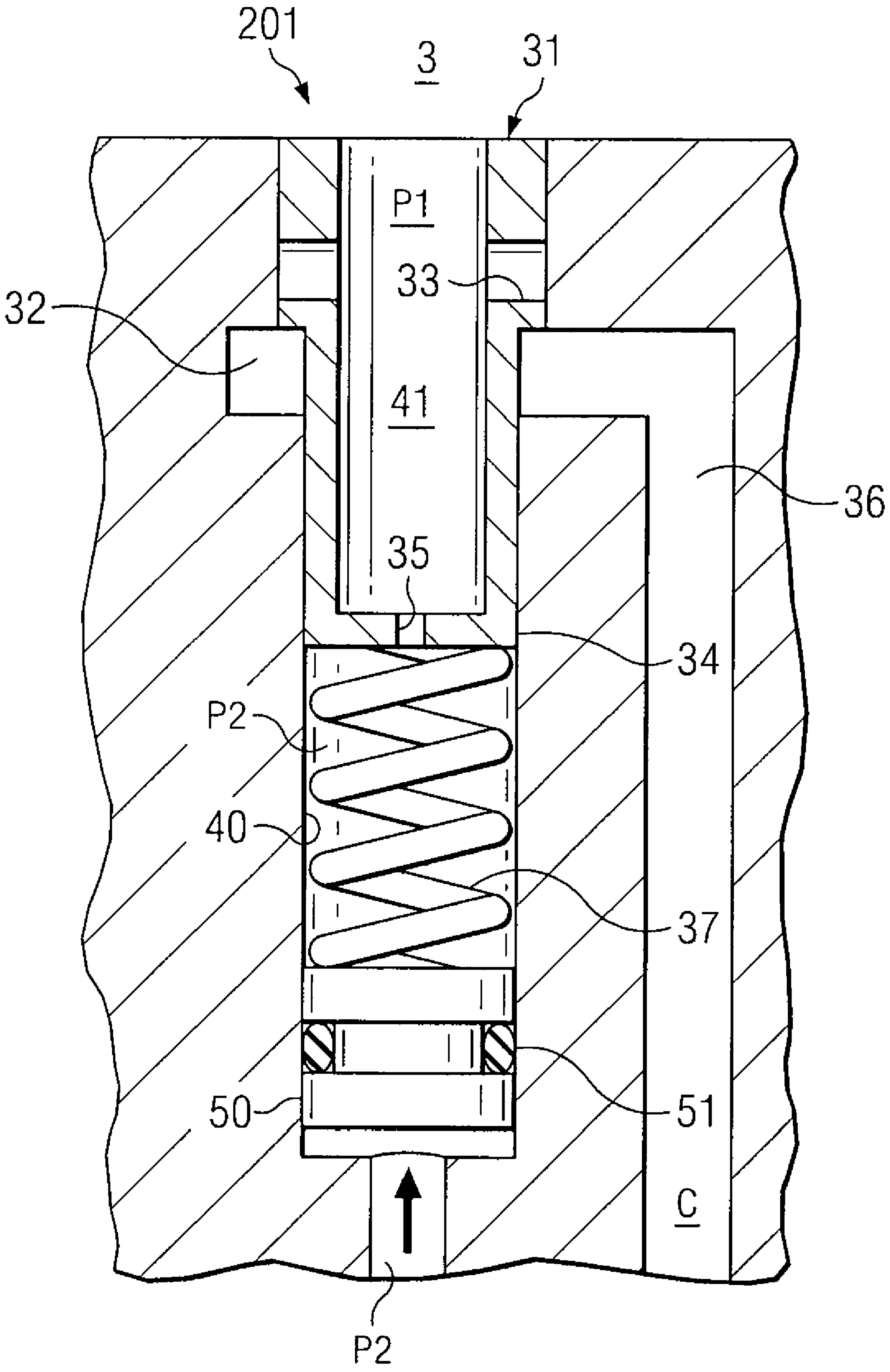
FIG. 10 illustrates the pressure relief valve having a diaphragm to control the valve compression.

FIG. 10 illustrates how the volume 40 and spring pre-compression may be controlled by using a diaphragm 50, which is displaced by oil pressure at P3. A lower pressure P3 allows relief valve 201 to open at a lower steady pressure P1 and also increases the volume 40 so that there is more fluid volume to be compressed and therefore more hydraulic compliance, allowing the relief valve to open at a lower rate of pressure rise. The pressure P3 can be provided from an independent modulated oil circuit in the engine.

Sealing of the diaphragm 50 is achieved with a sliding seal 51. Examples of suitable seals are piston-ring type or elastomeric seals.

With reference to both FIGS. 3 and 10, rate-sensitive pressure relief valve 201 is installed with diaphragm 50. The volume 4 beneath it is supplied with engine oil 100*e* via an adjusting channel. In the example of FIG. 10, the adjusting channel has telescopic female connection 19*b*, fitted in the gudgeon pin carrier 1*c*, which is in slideable connection with the male portion 19*a* of the telescopic oil conduit, the latter being connected to an oil supply within the engine.

Figure 11:
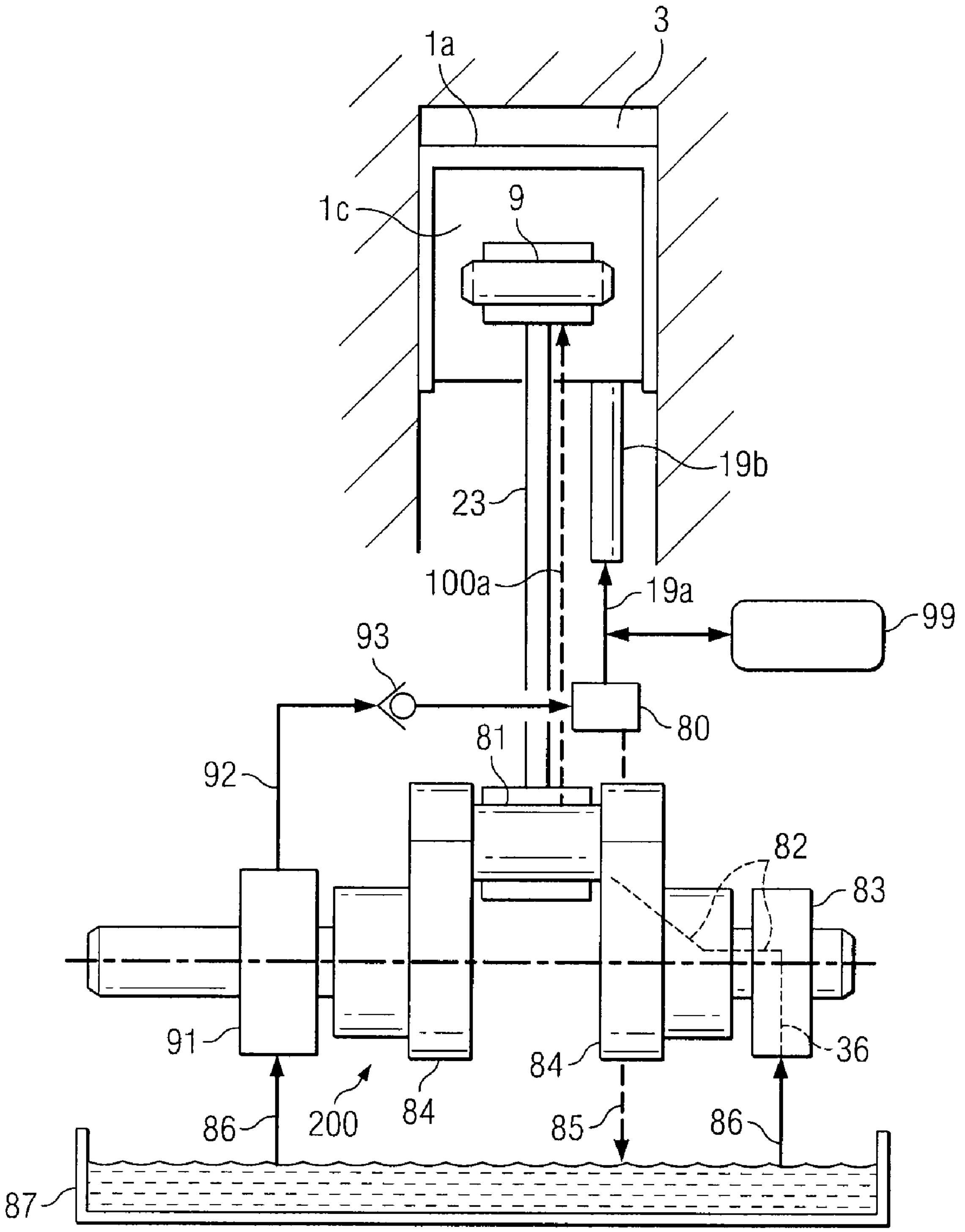
FIG. 11 illustrates a first embodiment of an oil circuit arrangement for controlling the oil pressure with regard to the variable rate limiting pressure relief valve.

FIG. 11 illustrates a first embodiment of an oil supply system for the embodiment of FIGS. 3 and 10. Although only a single cylinder of the engine is explicitly shown, the same oil supply system may serve multiple cylinders. The outer piston sleeve 1*a* and the gudgeon pin carrier 1*c* are connected via the gudgeon pin 9 to the connecting rod 23 which is slideably connected to the crankpin 81 of the crankshaft assembly 200. The crankshaft 200 receives oil 86 from sump 87 to its oil pump 83, and delivers part of this oil to the crankpin 81 via drillings 82, some of this oil 100*a* being supplied along the connecting rod 23 to the VCR piston elements 1*a* and 1*c*. A second oil pump 91, in one embodiment driven from the crankshaft 200, receives oil from the sump 87 and supplies the oil via a one way check valve 93 to a fast response pressure regulator 80, the excess flow being returned to the sump via oil return conduit 85. The regulated oil flow then enters the telescopic oil conduit 19*a*, which is in connection with an oil accumulator 99 and will act on diaphragm 50 (see FIG. 10) via the female telescopic connection 19*b*. In this way, the oil pressure, acting on diaphragm 50, can be regulated and stabilized to counteract the inherent pressure fluctuations from the telescopic action of the conduits 19*a* and 19*b*.

Figure 12:
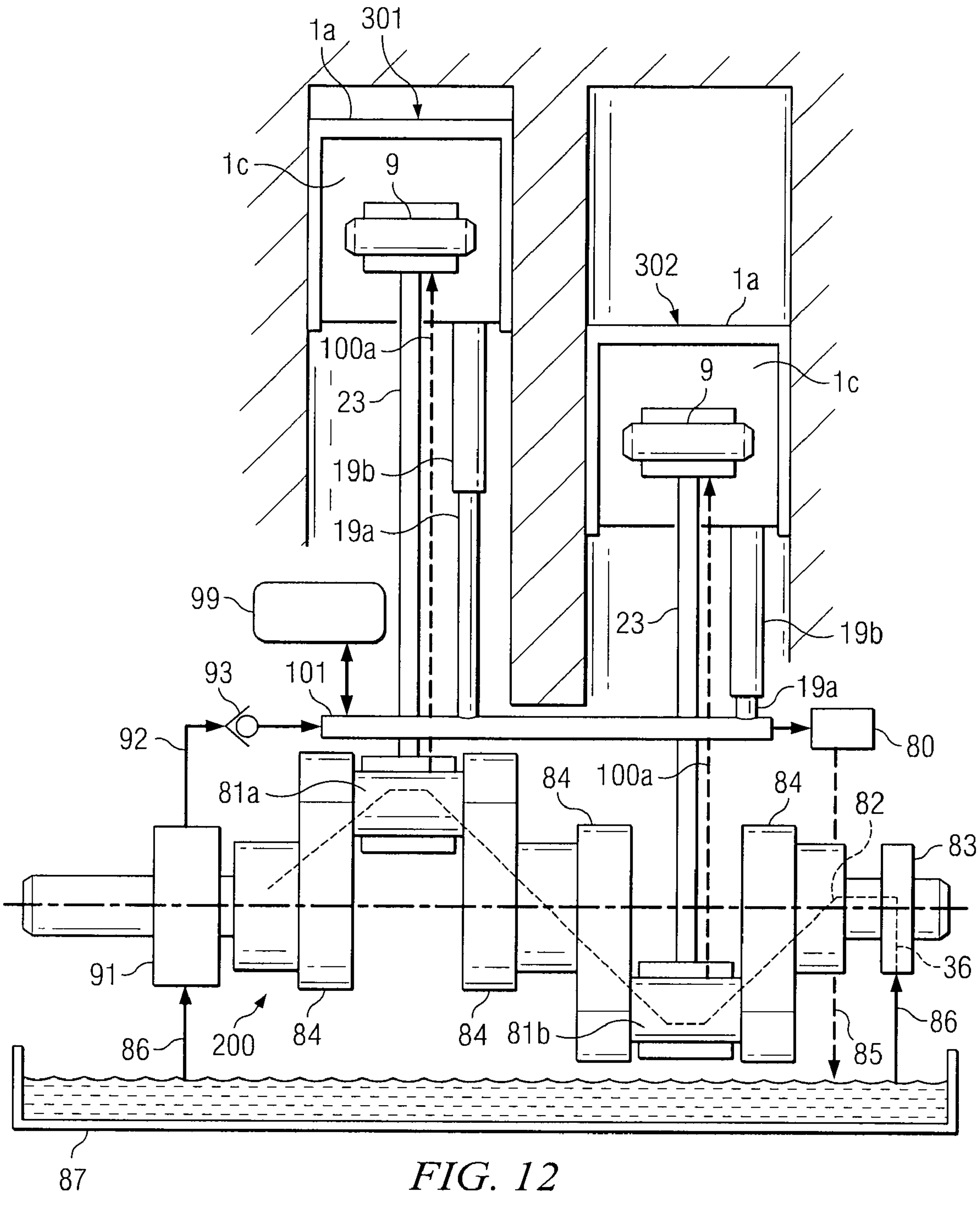
FIG. 12 illustrates a second embodiment of an oil circuit arrangement for controlling the oil pressure with regard to the variable rate limiting pressure relief valve.

FIG. 12 illustrates a second embodiment of an oil supply system for use with the piston of FIGS. 3 and 10. Two VCR pistons 301 and 302 are connected to crankshaft system 200. The outer piston sleeves 1*a* and the gudgeon pin carriers 1*c* of the VCR pistons are connected via the gudgeon pins 9 to the connecting rods 23. The connecting rods 23 are slideably connected to the crankpins 81*a* and 81*b* of the crankshaft assembly 200, said crankpins being phased relative to each other by a 180° crankangle. The crankshaft 200 receives oil 86 from the sump 87 to its oil pump 83 and delivers part of this oil to the crankpins 81*a* and 81*b* via drillings 82, some of this oil 100*a* being supplied along the connecting rod shanks 23 to the variable compression ratio piston elements 1*a* and 1*c*. A second oil pump 91, in one embodiment driven from the crankshaft 200, receives oil from the sump 87 and supplies the oil via a one way check valve 93 to a fast response pressure regulator 80, the excess flow being returned to the sump via oil return conduit 85. The regulated oil flow then enters the telescopic oil conduits 19*a* and 19*b*, which are in connection with an oil accumulator 99 and the pressure of the oil in gallery 101 will act on the diaphragm 50 (see FIG. 10) via the female telescopic connections 19*b*.

In this manner, the oil pressure, acting on the diaphragm 50, can be regulated and stabilized to counteract the inherent pressure fluctuations from the telescopic action of the conduits 19*a* and 19*b*. In a further stabilization of the oil flow in telescopic conduits 19*a* and 19*b*, the first cylinder's telescopic conduits 19*a* and 19*b* are connected via conduit 101 to the second cylinder's telescopic conduits 19*a* and 19*b* so that oil displaced from the telescopic conduits 19*a* and 19*b* of the first VCR piston, as it travels towards the crankshaft 200, is transferred to the second cylinder's telescopic conduits 19*a* and 19*b* via the connecting conduit 101. This is particularly advantageous if the first and second VCR pistons are phased by 180 crank degrees so that the total oil volume contained in the circuit between the two sets of telescopic conduits of the first and second pistons remains substantially constant, therefore improving the stabilization of the piston's diaphragms 50.

The rate-sensitive pressure relief valve 201 may be designed and sized to respond primarily to the rate of pressure rise, with another relief valve limiting the cylinder pressure according to a peak cylinder pressure level. An advantage of using two pressure relief valves is that each can be independently optimized, resulting in a better pressure rate sensitive VCR piston.

Figure 13:
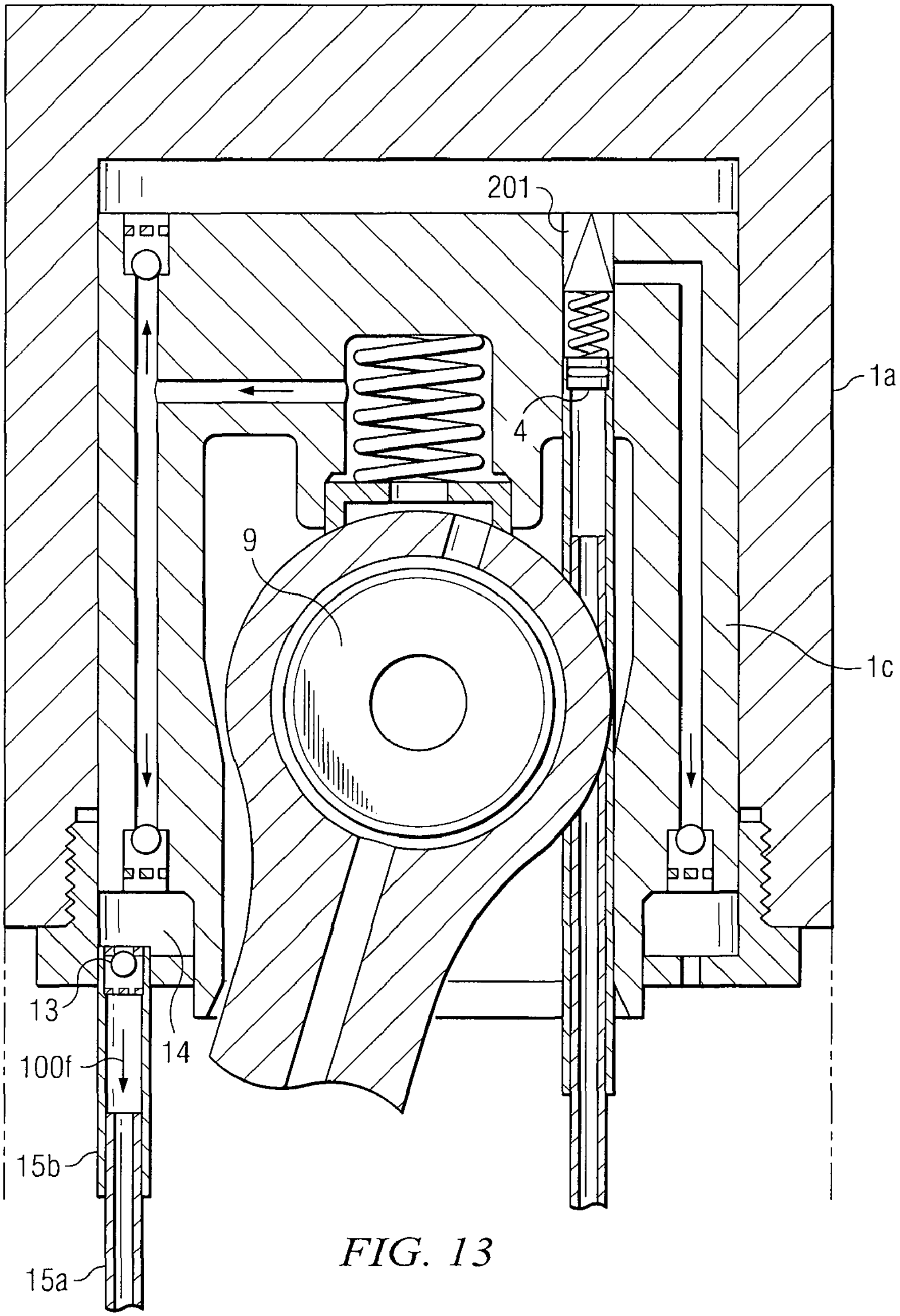
FIG. 13 illustrates a check valve and telescopic connection system for conducting wasted oil flow to a regenerative motor system.

As illustrated in FIG. 13, the second hydraulic chamber 14 also has at least one pressure relief valve 13, which may also be a rate sensitive pressure relief valve. Valve 13 delivers the relieved oil into an outer sleeve 15*b*, rigidly connected to the gudgeon pin carrier 1*c*, which is in sliding connection, optionally with seals, with a stand pipe 15*a*, the latter being connected to an oil circuit.

Figure 14:
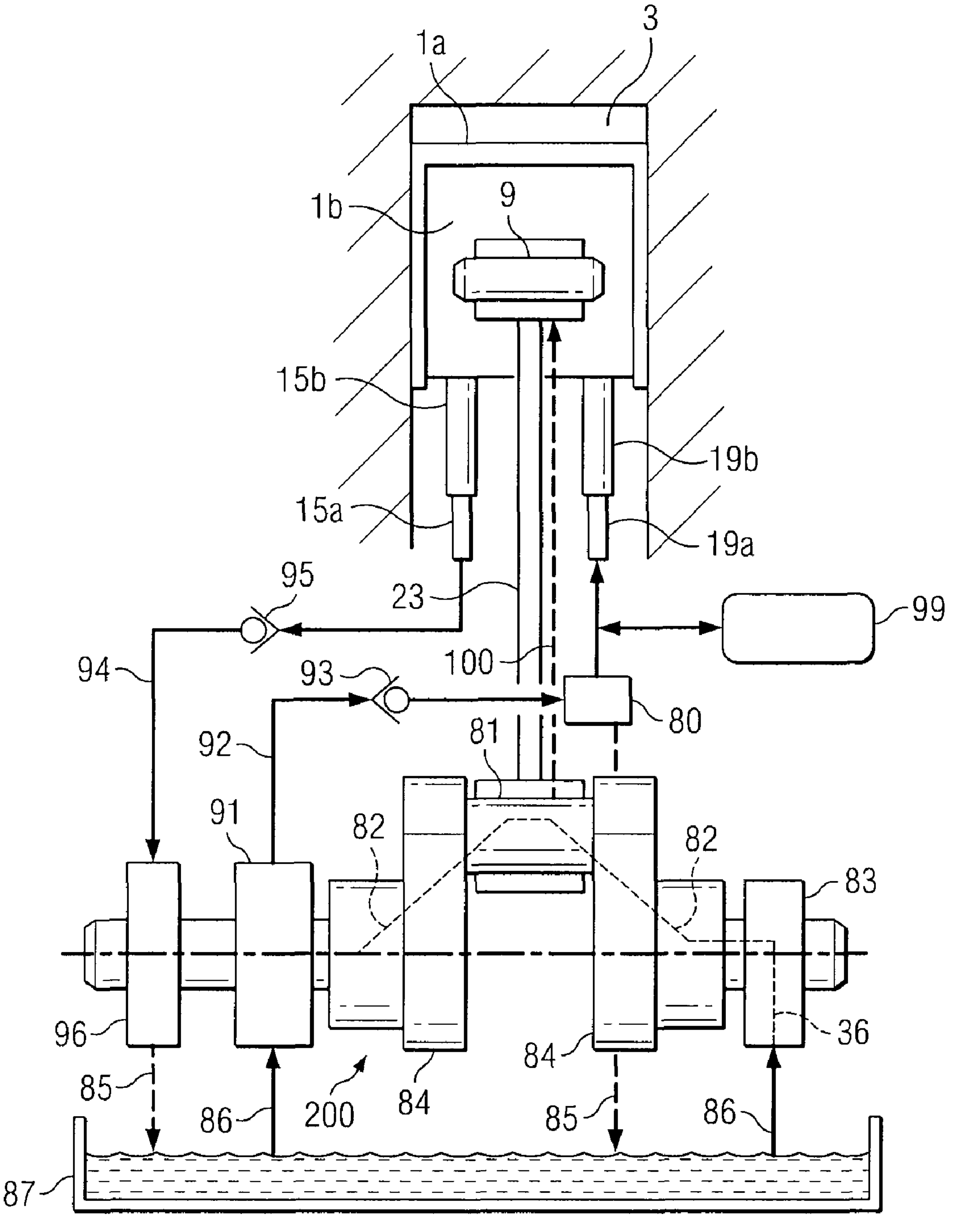
FIG. 14 illustrates the regenerative oil circuit used with the oil circuit of FIG. 11.

FIG. 14 is a modification of the oil system of FIG. 12, for use with the piston of FIG. 13. The wasted oil flow entering the telescopic conduits 15*a* and 15*b* are routed through a check valve 95 and thence to an oil motor 96, connected to the crankshaft 200, via conduit 94, the discharge from the oil motor entering the sump 87 via the discharge pipe 85. With this arrangement, some energy is recovered from the oil which passes through the pressure relief valve. The oil motor 96 is similar in operation to a positive displacement oil pump but the inlet and outlet porting is configured to enable the incoming oil to generate useful work which goes to the crankshaft.

The system described in connection with FIGS. 13 and 14 may be applied to each piston and cylinder of the engine. When applied to multiple cylinders, only one oil motor 96 is necessary, but each piston and cylinder combination has its own telescopic conduits 15*a* and 15*b*, its own check valve 95, and its own conduit 94 to the oil motor 96.

The motor 96 and pumps 83 and 91 will usually have relief valves which are not shown in order to simplify the figures.

For the embodiments of FIG. 3 or FIG. 13, if desired, connecting rod 23 and cylinder 26 may be lengthened to enable the telescopic conduits to be fitted without obstructing the crankshaft. The telescopic conduits, 15*a* and 15*b*, or 19*a* and 19*b*, may comprise more than two elements, depending on the movement of the piston and may be fitted with either internal or external seals or both internal and external seals. The internal seals are usually of the sliding piston ring type with a scarfed joint or gap, and the external seals may be of the lip seal type.

Figure 15:
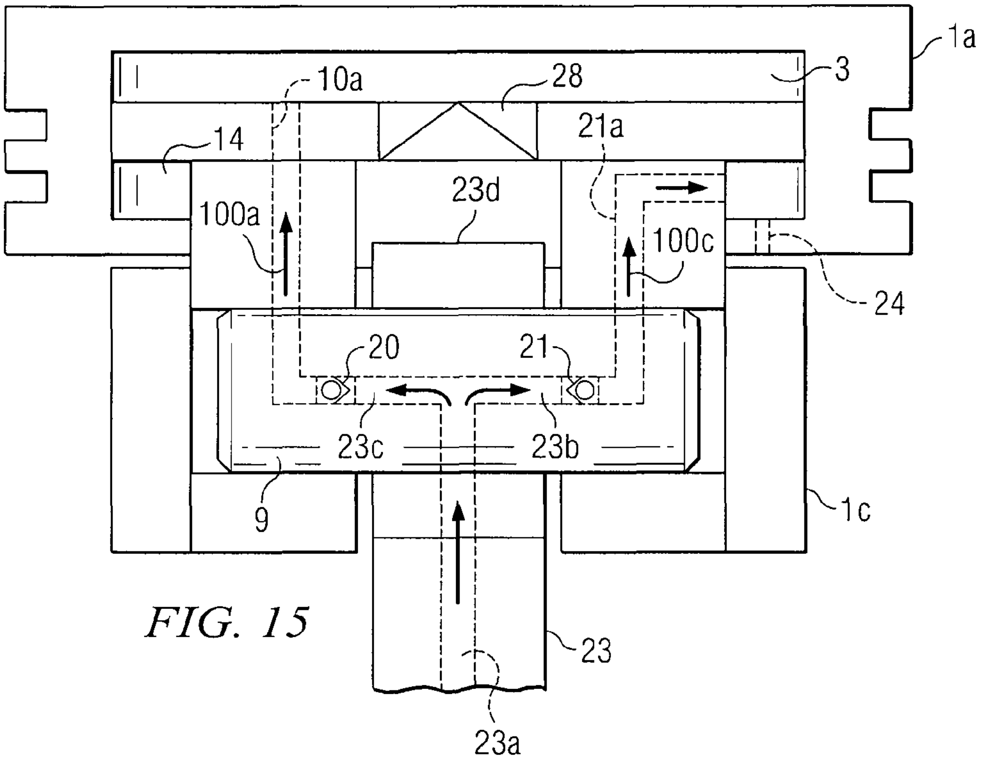
FIG. 15 is a front view of an alternative embodiment of the invention, in which relief valves are contained in the gudgeon pin.
Figure 16:
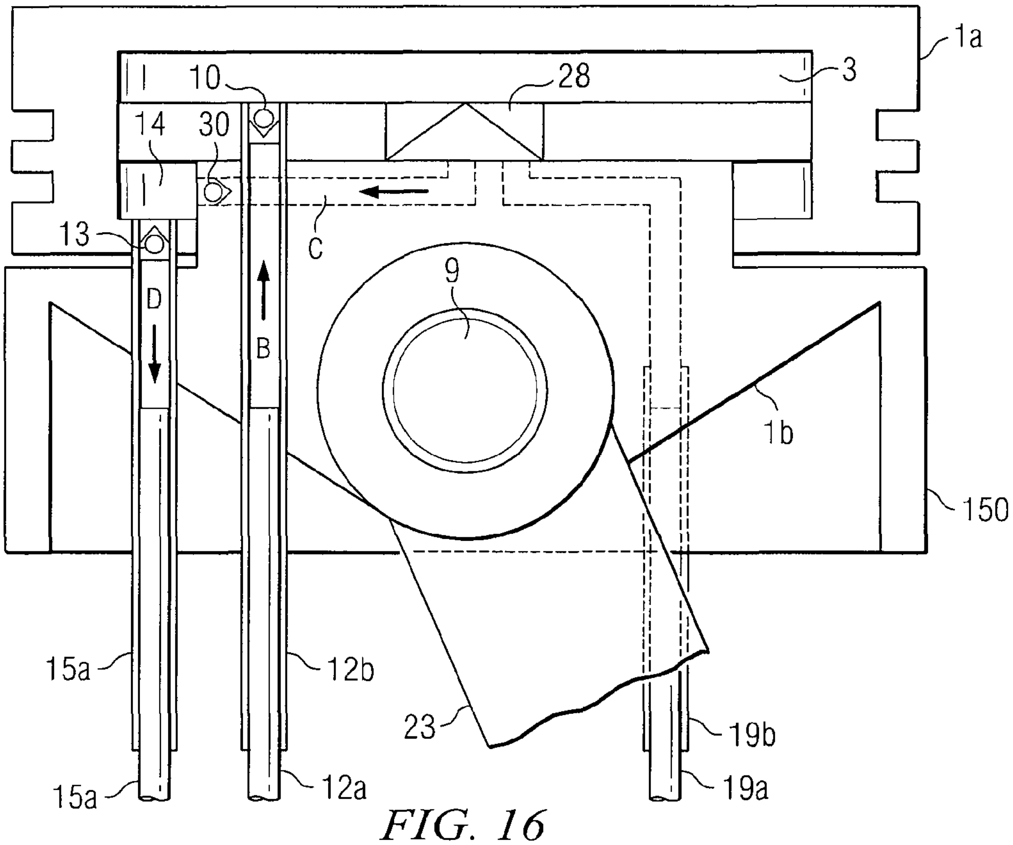
FIG. 16 is a side view of an alternative embodiment of the invention, in which relief valves are contained in the gudgeon pin and a piston skirt is used as a crosshead.

FIGS. 15 and 16 illustrate an alternative embodiment of the VCR piston, whose gudgeon pin carrier 1*c* is extended with a skirt 150 to form a crosshead. The top of the sleeve 150 has clearance to the bottom surface of the outer sleeve 1*a*, and skirt 150 takes the side loads of the connecting rod 23, while the outer sleeve 1*a* does not take any side thrust from the connecting rod. This embodiment reduces the side movement acting on the standing pipes, although it should be realized that there is a running clearance between the stationary standing pipes 15*a* and 19*a* and the moving mating pipes 15*b* and 19*b*. Leakage through these clearances may be reduced by the use of appropriate seals, as described previously.

FIG. 15 also shows that entry (check) valves 20 and 21 can be located in the gudgeon pin 9, which has inner channels 23*b* for carrying oil from the primary channel 23*a* in the connecting rod 23 into the gudgeon pin carrier 1*c*. These valves control the oil flow 100*a* from the connecting rod to the upper hydraulic chamber 3 via a first inner channel 10*a* in the gudgeon pin carrier, and the flow 100*c* to the lower hydraulic chamber 14 via a second inner channel 21*a* in the gudgeon pin carrier.

In the embodiment of FIGS. 15 and 16, the upper and lower chambers may relieve oil using pressure relief valves, which operate in a manner similar to the pressure relief valves described above. As described above, these pressure relief valves may be rate-sensitive pressure relief valves like those described above. For example, a pressure relief valve 28 may relieve oil from the upper chamber 3 into a relief channel. Furthermore, both the upper chamber 3 may have a pressure relief valve 28, and the lower chamber 14 may have a pressure relief valve 13. Telescoping conduits 15*a* and 15*b*, and 19*a* and 19*b* operate in a manner described in connection with the embodiments described above.

Summary

As described above, and referring to all embodiments, a hydraulic VCR piston 200 has a rate-sensitive pressure relief valve 201, which responds to the rate of change of cylinder pressure. The same arrangement also responds to peak cylinder pressures. The pressure relief valve 201 has a sleeve valve 31 slideable within a volume 40. An orifice 35 in the sleeve valve 31 provides fluid (oil) communication between the volume and the upper chamber 3. See especially FIGS. 2, 3, 4, 5, 7, and 8.

In some embodiments, the relief valve volume 40 is bounded on one side by an adjustable diaphragm 50. The position of the adjustable diaphragm 50 is regulated by oil pressure. The adjustable diaphragm 50 may be connected to telescopic conduits 19*b* and 19*a* which are connected to an oil supply system. See especially FIG. 10.

The oil supply system comprises at least one oil pump 83, 91, a check valve, a pressure regulator 80 and an accumulator 99. The oil pump 83, 91 is driven by the crankshaft 200. See especially FIG. 11.

In the oil supply system, at least two hydraulic VCR pistons may be connected together by means of at least two sets of telescopic conduits 19*a* and 19*b* which are interconnected by an oil conduit 101. The interconnecting oil conduit 101, between the two sets of telescopic conduits 19*a* and 19*b*, may be connected to an accumulator 99. See especially FIG. 12.

In some embodiments, the oil discharge 100*d* from the relief valve 201 is directed to the lower hydraulic chamber 14 via a valve. The lower chamber 14 may relieve its oil through a pressure relief valve and telescopic conduits 15*b* and 15*a*. This pressure relief valve may be a rate-sensitive pressure relief valve. The valve relieves oil to telescoping pipes 15*b* and 19*b*, which slideably connect with standing pipes 15*a* and 19*a* respectively. See especially FIG. 13.

In some embodiments, the gudgeon pin carrier 1*c* is configured as a crosshead for the piston assembly. See especially FIGS. 15 and 16.

In some embodiments, the rate-sensitive pressure relief valve associated with the upper chamber may be located in the gudgeon pin. A rate-sensitive pressure relief valve associated with the lower chamber may also be located in the gudgeon pin. See especially FIGS. 15 and 16.

What is claimed is:

1. A variable compression ratio piston for an internal combustion engine that drives a crankshaft connected to the piston by a connecting rod and gudgeon pin, the piston operable to move within a cylinder in response to cylinder pressure, the connecting rod and gudgeon pin having a primary channel for carrying oil into the piston, comprising:

a two-part piston having an outer sleeve and a gudgeon pin carrier;

the outer sleeve being slideable within the cylinder;

the gudgeon pin carrier being slideable within the outer sleeve and positioned within the outer sleeve to form an upper chamber between the upper surface of the gudgeon pin carrier and the crown of the outer sleeve and to form a lower chamber between the lower surface of the gudgeon pin carrier and the closing end of the outer sleeve;

a spring-loaded seal in the top end of the gudgeon pin carrier that receives the oil from the primary channel and delivers the oil to a first inner channel and a second inner channel within the gudgeon pin carrier;

a first entry valve for delivering oil from the first inner channel into the upper chamber;

a second entry valve for delivering oil from the second inner channel into the lower chamber;

a rate-sensitive relief valve for relieving oil from the upper chamber;

wherein the relief valve is a sleeve-type valve having a spring-loaded male element slidebly contained in a dead-ended bore, the male element having a hollow interior and a pressure face at a bottom end of the hollow interior to which pressure from oil in the upper chamber is applied, a spring housed below the male element in the bore, and a bleed orifice providing fluid communication between the pressure face and the portion of the bore containing the spring;

wherein the relief valve is configured such that oil may flow from the hollow interior into the portion of the bore containing the spring when the relief valve is closed; and a relief channel for carrying oil from the upper chamber via the rate-sensitive relief valve.

2. The piston of claim 1, wherein the relief channel delivers the relieved oil into the lower chamber.

3. A variable compression ratio piston for an internal combustion engine that drives a crankshaft connected to the piston by a connecting rod and gudgeon pin, the piston operable to move within a cylinder in response to cylinder pressure, the connecting rod and gudgeon pin having a primary channel for carrying oil into the piston, comprising:

a two-part piston having an outer sleeve and a gudgeon pin carrier;

the outer sleeve being slideable within the cylinder;

the gudgeon pin carrier being slideable within the outer sleeve and positioned within the outer sleeve to form an upper chamber between the upper surface of the gudgeon pin carrier and the crown of the outer sleeve and to form a lower chamber between the lower surface of the gudgeon pin carrier and the closing end of the outer sleeve;

a spring-loaded seal in the top end of the gudgeon pin carrier that receives the oil from the primary channel and delivers the oil to a first inner channel and a second inner channel within the gudgeon pin carrier;

a first entry valve for delivering oil from the first inner channel into the upper chamber; a second entry valve for delivering oil from the second inner channel into the lower chamber;

a rate-sensitive relief valve for relieving oil from the upper chamber, the relief valve having at least a spring-loaded male element slideably contained in a dead-ended bore; and a relief channel for carrying oil from the upper chamber via the rate-sensitive relief valve;

wherein the relief valve has a diaphragm at the dead end of the dead-ended bore, whose position is adjustable to make the dead-ended bore longer or shorter.

4. The piston of claim 3, wherein the position of the diaphragm is controlled by oil pressure from an adjusting channel.

5. The piston of claim 4, wherein the adjusting channel has a telescopic female conduit in slideable connection with a male conduit, the latter being connected to an oil supply system.

6. A variable compression ratio piston assembly for an internal combustion engine that drives a crankshaft connected to the piston by a connecting rod, such that the piston moves within a cylinder in response to cylinder pressure, the connecting rod having a primary channel for carrying oil into the piston, comprising:

a two-part piston having an outer sleeve and a gudgeon pin carrier;

the outer sleeve being slideable within the cylinder;

the gudgeon pin carrier being slideable within the outer sleeve and positioned within the outer sleeve to form an upper chamber between the upper surface of the gudgeon pin carrier and the crown of the outer sleeve and to form a lower chamber between the lower surface of the gudgeon pin carrier and the closing end of the outer sleeve;

the gudgeon pin carrier further having a first inner channel in fluid communication with the upper chamber and a second inner channel in fluid communication with the lower chamber;

a gudgeon pin that connects the connecting rod to the gudgeon pin carrier, the gudgeon pin having gudgeon pin channels that deliver oil from the primary channel to the first inner channel and the second inner channel;

the gudgeon pin further containing a first valve for delivering oil into the first inner channel, and a second valve for delivering oil into the second inner channel;

a rate-sensitive relief valve in the upper portion of the gudgeon pin carrier, operable to relieve oil from the upper chamber;

wherein the relief valve is a sleeve-type valve having a spring-loaded male element slidebly contained in a dead-ended bore, the male element having a hollow interior and a pressure face at a bottom end of the hollow interior to which pressure from oil in the upper chamber is applied, a spring housed below the male element in the bore, and a bleed orifice providing the only fluid communication between the pressure face and the portion of the bore containing the spring, such that oil may flow from the hollow interior into the portion of the bore containing the spring;

wherein the relief valve is configured such that oil may flow from the hollow interior into the portion of the bore containing the spring when the relief valve is closed; and a relief channel for carrying oil from the upper chamber via the rate-sensitive relief valve.

7. The piston of claim 6, wherein the relief channel delivers the oil into the lower chamber.

8. The piston of claim 6, wherein the gudgeon pin carrier is extended with a skirt to form a crosshead contacting the bottom surface of the outer sleeve.

9. A variable compression ratio piston assembly for an internal combustion engine that drives a crankshaft connected to the piston by a connecting rod, such that the piston moves within a cylinder in response to cylinder pressure, the connecting rod having a primary channel for carrying oil into the piston, comprising:

two-part piston having an outer sleeve and a gudgeon pin carrier;

the outer sleeve being slideable within the cylinder;

the gudgeon pin carrier being slideable within the outer sleeve and positioned within the outer sleeve to form an upper chamber between the upper surface of the gudgeon pin carrier and the crown of the outer sleeve and to form a lower chamber between the lower surface of the gudgeon pin carrier and the closing end of the outer sleeve;

the gudgeon pin carrier further having a first inner channel in fluid communication with the upper chamber and a second inner channel in fluid communication with the lower chamber;

a gudgeon pin that connects the connecting rod to the gudgeon pin carrier, the gudgeon pin having gudgeon pin channels that deliver oil from the primary channel to the first inner channel and the second inner channel;

the gudgeon pin further containing a first valve for delivering oil into the first inner channel, and a second valve for delivering oil into the second inner channel;

a rate-sensitive relief valve in the upper portion of the gudgeon pin carrier, operable to relieve oil from the upper chamber, the relief valve having at least a spring-loaded male element slideably contained in a dead-ended bore; and a relief channel for carrying oil from the upper chamber via the rate-sensitive relief valve;

wherein the relief valve has a diaphragm at the dead end of the dead-ended bore, whose position is adjustable to make the dead-ended bore longer or shorter.

10. The piston of claim 9, wherein the position of the diaphragm is controlled by oil pressure from an adjusting channel.

11. The piston of claim 10, wherein the adjusting channel has a telescopic female conduit in slideable connection with a male conduit, the latter being connected to an oil supply system.

12. The piston of claim 10, wherein the engine has an oil supply system, which has a regulator for regulating the flow into the adjusting channel.

13. The piston of claim 10, wherein the engine has an oil supply system, which provides oil to multiple pistons, each having an adjusting channel, and whose adjusting channels are interconnected.

14. A variable compression ratio piston for an internal combustion engine that drives a crankshaft connected to the piston by a connecting rod and gudgeon pin, the piston operable to move within a cylinder in response to cylinder pressure, the connecting rod and gudgeon pin having a primary channel for carrying oil into the piston, comprising:

a two-part piston having an outer sleeve and a gudgeon pin carrier;

the outer sleeve being slideable within the cylinder;

the gudgeon pin carrier being slideable within the outer sleeve and positioned within the outer sleeve to form an upper chamber between the upper surface of the gudgeon pin carrier and the crown of the outer sleeve and to form a lower chamber between the lower surface of the gudgeon pin carrier and the closing end of the outer sleeve;

a spring-loaded seal in the top end of the gudgeon pin carrier that receives the oil from the primary channel and delivers the oil to a first inner channel and a second inner channel within the gudgeon pin carrier;

a first entry valve for delivering oil from the first inner channel into the upper chamber;

a second entry valve for delivering oil from the second inner channel into the lower chamber;

a rate-sensitive relief valve for relieving oil from the upper chamber;

wherein the relief valve is a poppet-type valve having a spring-loaded male element slideably contained in a dead-ended bore, the male element having a pressure face at an upper surface to which pressure from oil in the upper chamber is applied, a spring housed in a portion of the bore below the male element, and a bleed orifice or channel that provides fluid communication between the pressure face and the portion of the bore containing the spring;

wherein the relief valve is configured such that oil may flow from the hollow interior into the portion of the bore containing the spring when the relief valve is closed; and a relief channel for carrying oil from the upper chamber via the rate-sensitive relief valve.

15. A variable compression ratio piston assembly for an internal combustion engine that drives a crankshaft connected to the piston by a connecting rod, such that the piston moves within a cylinder in response to cylinder pressure, the connecting rod having a primary channel for carrying oil into the piston, comprising:

a two-part piston having an outer sleeve and a gudgeon pin carrier;

the outer sleeve being slideable within the cylinder;

the gudgeon pin carrier being slideable within the outer sleeve and positioned within the outer sleeve to form an upper chamber between the upper surface of the gudgeon pin carrier and the crown of the outer sleeve and to form a lower chamber between the lower surface of the gudgeon pin carrier and the closing end of the outer sleeve;

the gudgeon pin carrier further having a first inner channel in fluid communication with the upper chamber and a second inner channel in fluid communication with the lower chamber;

a gudgeon pin that connects the connecting rod to the gudgeon pin carrier, the gudgeon pin having gudgeon pin channels that deliver oil from the primary channel to the first inner channel and the second inner channel;

the gudgeon pin further containing a first valve for delivering oil into the first inner channel, and a second valve for delivering oil into the second inner channel;

a rate-sensitive relief valve in the upper portion of the gudgeon pin carrier, operable to relieve oil from the upper chamber;

wherein the relief valve is a poppet-type valve having a spring-loaded male element slideably contained in a dead-ended bore, the male element having a pressure face at an upper surface to which pressure from oil in the upper chamber is applied, a spring housed in a portion of the bore below the male element, and a bleed orifice or channel that provides fluid communication between the pressure face and the portion of the bore containing the spring;

wherein the relief valve is configured such that oil may flow from the hollow interior into the portion of the bore containing the spring when the relief valve is closed; and a relief channel for carrying oil from the upper chamber via the rate-sensitive relief valve.

* * * * *